United States Patent Office 3,038,496
Patented June 12, 1962

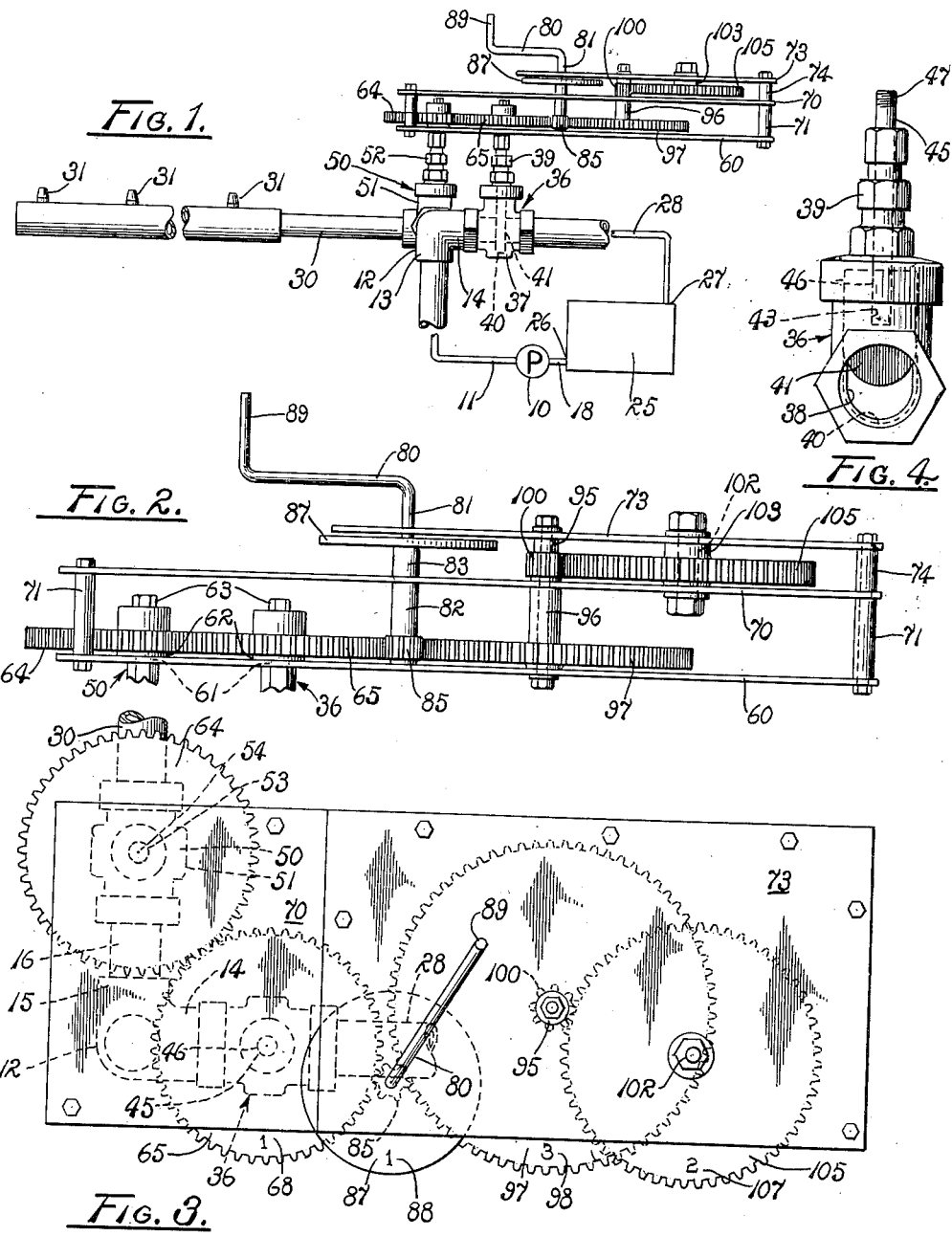

3,038,496
FLUID FLOW REGULATION
Dolph W. Ruschhaupt, Fresno, Calif., assignor to California-Fresno Investment Corp., Fresno, Calif., a corporation of California
Filed Feb. 10, 1958, Ser. No. 714,112
3 Claims. (Cl. 137—609)

The present invention relates to fluid flow regulation and more particularly to a method and apparatus for receiving fluid from a source which delivers fluid at a variable rate of flow and for proportioning or metering the flow rate between a plurality of outlets.

In mixing asphaltic compositions for application to road surfaces, and in many other mixing operations, it is sometimes desirable to change the proportions of the ingredients introduced into the mix in a simple and expeditious manner. The fluid flow systems of the prior art for the most part have not been satisfactory in this regard.

For example, it has been conventional to deliver asphalts, tars, and other sticky and gummy substance to asphaltic mixing machines by a positive displacement pump gear-driven by a pump motor. The fluid flow rate of such a pump is usually approximately proportional to the speed of the pump. However, most systems of this nature require that the size of the gear or sprocket connecting the pump and the motor be changed each time it is desired to change the speed of the pump and thus the flow rate. This is an onerous, time consuming task hardly suited to efficient operation of the mixing machine. Normal flow meters are unsuitable inasmuch as such adherent materials render them inoperative after short or intermittent periods of use.

Accordingly, it is an object of the present invention to provide improvements in fluid proportioning or metering methods and apparatus.

Another object is to receive fluid from a source adapted to deliver fluid at a variable rate of flow and to proportion or to meter the fluid between a plurality of outlets.

Another object is to regulate the rate of fluid flow to a predetermined outlet from a motor-driven pump without changing the gear ratio between the pump and the motor.

Another object is to enable a pump to operate at full capacity at all times but to be able to obtain any portion from zero to maximum of said capacity at a predetermined outlet.

Another object is to provide a pair of valves adapted to receive fluid from a common source and to proportion or to meter such fluid between individual outlets.

Another object is to provide a calibrated fluid metering or proportioning apparatus.

Another object is to provide an apparatus which delivers fluid from a source to an outlet in controllable and variably measured amounts.

Other objects are to provide a method and apparatus of the nature described which is simple and economical, dependable in action, and adapted to metering many and varied types of fluid.

These, together with other objects, will become more fully apparent upon reference to the following description.

In the drawing:

FIG. 1 is a side elevation of a fluid flow regulating apparatus embodying the principles of the present invention as employed in a fluid flow system.

FIG. 2 is a somewhat enlarged fragmentary side elevation of a portion of the regulating apparatus.

FIG. 3 is a fragmentary top plan view of the regulating apparatus.

FIG. 4 is a somewhat enlarged face view of a valve employed in the regulating apparatus of the present invention.

Referring more particularly to the drawing, a fluid flow system in which the subject invention may advantageously be incorporated includes a positive displacement fluid pump 10 having an outlet pipe 11 for delivering a predetermined substantially constant rate of fluid flow at any given speed of the pump. An outlet T-fitting 12 has a pipe section 13 connected to the outlet pipe, a duct section 14 and an outlet section 15. An outlet nipple 16 is connected to the outlet section of the T-fitting. The pump also has an inlet pipe 18. Such pumps are characterized by the fact that the flow rate varies substantially linearly with the speed of the pump.

A fluid reservoir 25 includes an outlet 26 connected to the inlet pipe 18 of the pump 10 and an input 27 to which is connected a by-pass duct 28. An outlet conduit 30 is provided and is connected to a plurality of spray nozzles 31. However, it is to be noted that whereas the outlet flow rate of the pump is substantially constant at any given speed of the pump, the subject invention is adapted to provide a variable rate of fluid flow in the outlet conduit for any such given speed and in a manner to be described.

A by-pass valve 36 includes a valve body 37 interconnecting the duct section 14 of the T-fitting 12 and the by-pass duct 28. The body includes a substantially circular orifice 38 disposed transversely of the duct section and the duct and in substantially axial alignment therewith. The body has a tubular bushing 39 radially outwardly extended from the orifice and a U-shaped groove 40 extended partially around the orifice. A valve plate 41 is slidably fitted in the groove of the body for slidable movement between limiting positions completely opening and completely closing the orifice and intermediate positions, as seen in FIG. 4, partially opening and partially closing the orifice. The valve plate has an internally threaded bore 43 opening outwardly in substantially concentric relation to the bushing. A valve control rod 45 is slidably mounted on the bushing and includes a threaded shank 46 screw-threaded in the bore 43 and an externally threaded end or stud 47 extended outwardly of the bushing.

An outlet valve 50 is constructed in the identical manner as the by-pass valve 36 and accordingly no specific description of its parts is believed necessary. However, reference is made by distinguishing numerals to those portions of the outlet valve which are visible in the drawing. The outlet valve thus has a valve body 51 interconnecting the outlet section 15 of the T-fitting 12 and the outlet conduit 30 and including a tubular bushing 52, and a valve control rod 53 having an end 54 terminating in external threads. Although not illustrated in the drawing, the valve body provides an orifice which is substantially coaxial with the outlet conduit and the outlet section of the T-fitting. As with the by-pass valve, the valve plate, not shown, of the outlet valve is movable by the control rod between limiting positions completely opening or completely closing the outlet valve orifice and intermediate positions partially opening and partially closing such orifice.

A lower, substantially flat support panel 60 has a pair of spaced openings 61 fitted over the studs 47 and 54 of the valves 36 and 50 and rested against the tubular bushings 39 and 52. Washers 62 are placed over the studs against the panels. An outlet gear 64 is concentrically secured to the outlet valve stud, and a by-pass gear 65 is concentrically secured to the by-pass valve stud and is in mesh with the outlet gear on the opposite side of the panel from the valve bodies 37 and 51. Nuts 63 are screw-threaded on the ends of the studs for maintaining assembly of the gears and the panel. It will be evident that this arrangement precludes longitudinal sliding movement of the valve control rods 45 and 53 in their respective valve bodies 37 and 51. Further, the by-pass gear has calibrations 68 in units of one thousand each around its periphery and on the surface thereof opposite from the surface facing the panel.

An intermediate support panel 70 is mounted on the lower support panel 60 and is held in substantially parallel relation thereto by means of a plurality of spacers 71. An upper support panel 73 is mounted in spaced substantially parallel relation to the intermediate panel by spacers 74.

A crank 80 includes an inner portion 81 extended through the upper and intermediate panels 73 and 70 and journaled in spacer bearings 82 and 83 for rotation relative to the panels. A pinion 85 is secured to the inner portion of the crank and is in mesh with the by-pass gear 65. A calibration disc 87 is also secured to the inner portion of the crank adjacent to the upper panel 73 and includes calibrations 88 in units of one hundred each on its upwardly disposed surface. The crank also has an outer manipulating portion 89.

A primary driven shaft 95 is extended through the panels 60, 70 and 73 and is journaled in spacers 96 for rotation relative to the panels. A primary driven gear 97 is secured to the primary shaft adjacent to the lower panel and is in mesh with the drive pinion 85. The primary gear also has calibrations 98 in units of ten each on its upwardly disposed surface. A driven pinion 100 is secured to the primary shaft intermediate the upper and intermediate panels. A secondary shaft 102 is extended through the upper and intermediate panels and is journaled in a spacer 103. A secondary gear 105 is secured to the secondary shaft, is in mesh with the driven pinion, and has calibrations 107 in units of one each on its upwardly disposed surface.

Operation

The operation of the described embodiment of the subject invention is believed to be readily apparent and is briefly summarized at this point.

The pump 10 is driven in any convenient manner as by a pump motor connected to the pump by gears, not shown, so as to pump fluid into the outlet pipe 11 from the reservoir 25. The rate of flow through the outlet pipe is, of course, partially determined by the speed of rotation of the pump which is preferably of the positive displacement type. The speed of the pump is adjusted to give a predetermined fluid flow rate usually measured in gallons per minute. In order to change the flow rate, it has conventionally been necessary to change the gear ratio between the drive pump motor, not shown, and the pump. However, the subject invention obviates this necessity.

If the maximum fluid flow rate of the pump 10 is desired at the nozzles 31, the crank 80 is rotated to a predetermined setting of the calibrations 68, 88, 98 and 107 whereby the valve plate 41 of the by-pass valve 36 is completely closed and the valve plate, not shown, of the outlet valve 50 is completely open. However, if it is desired to reduce the flow rate at the nozzles by a predetermined amount, the crank handle is again turned to a predetermined setting of the by-pass gear 65, the calibration disk 87, and primary and secondary driven gears 97 and 105, all as indicated by the calibrations, so as to close the valve plate of the outlet valve by a predetermined amount and correspondingly to open the valve plate of the by-pass valve by a predetermined amount. It will thus be seen that a certain proportion of fluid is returned to the reservoir 25 through the by-pass valve and the by-pass duct 28. It will be evident that the rate of fluid flow in the outlet conduit 30 can be continually and successively decreased by rotating the crank so as gradually to close the by-pass valve orifice and to open the outlet valve orifice.

It is significant to note that there is a proportioning between the two valves of the predetermined total flow rate of the pump. The advantage of the subject system is that the pump flow rate can be maintained substantially constant at its maximum value while the flow rate in the outlet conduit 30 can be varied in a predetermined manner as determined by the calibrated gears. The apparatus thus meters fluid pumped from the pump 10 into the spray nozzles 31 or other point of discharge. However, it is to be understood that the flow rate of the pump can be and frequently is changed during actual operation of the invention in an asphaltic mixing machine, for example. At any given setting of the crank 80, however, the proportion of flow between the outlet conduit 30 and the by-pass duct 28 is the same and is known in advance by the calibrations. Conversely, for any given speed of the pump, the proportion of flow between the outlet conduit and the by-pass duct can be changed by turning the crank.

The subject invention is particularly adapted for use in certain mixing operations and in practice has been used in mobile asphalt mixing machines adapted to mix the asphalt and to apply it to a road surface while traversing such surface. In this mixing operation, two or more systems like that shown in FIG. 1 are employed. For example, one of the reservoirs 25 may contain liquid asphalt and another reservoir 25 may contain water. Both pumps 10 are gear-driven by a common prime mover so that increases and decreases in the speed of the prime mover and thus the pumps correspondingly change the flow rate of each of the pumps. The proportions of water and asphalt introduced into the mix determine its character and it is desirable to be able to change these proportions for various types of mixes. As previously explained, in the past, it has been necessary to change the driving gear for the pump in order to change the speed and thus the flow rate of the pump. Obviously, in a mobile mixing machine where it may be desired rapidly to change the proportions of the ingredients of the mix, frequent gear changes are not practical. With the subject invention it is simply necessary to calibrate each of the systems of the type shown in FIG. 1 at any particular speed of the prime mover to give certain proportions of water to asphalt. Thereafter, regardless of the speed of the prime mover, the proportions remain. Then, if it is desired to change the proportions, it is simply necessary to recalibrate either system by turning the crank 80 to the predetermined calibrations 68, 88, 98 and 107 corresponding to the new proportions.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for metering the flow of liquid asphalt between a utilization outlet and a reservoir from a pump delivering a substantially constant quantity of liquid asphalt comprising a three-section T-fitting including a pump section adapted to be connected to such a pump, an outlet section, and a by-pass section; individual outlet and by-pass valves of uniform construction, each valve including a valve body having axially aligned inlet and outlet ports, a substantially straight fluid passageway of uniform maximum cross-sectional area interconnecting its respective ports in axial alignment therewith, said passageways having substantially the same maximum cross-sectional areas, each valve body having a U-shaped groove partially circumscribing and opening into the passageway therein, a flat valve plate slidably fitted in the groove of each body and being movable therein transversely in its respective passageway between positions fully opening and fully closing such passageway and intermediate positions partially opening the passageway, each groove and its associated plate having a substantially uniform dimension measured longitudinally of their passageway but with said dimension of the groove being slightly greater than that of the plate to permit said slidable movement, each of the valve plates having an end edge disposed toward its associated passageway and, together with the groove, defining the effective asphalt admitting cross-sectional area of such passageway in the partially and fully open positions of the valve plate, and a control rod rotatably mounted in each body exteriorly of its passageway and screw-threadably connected to its associated valve plate whereby rotation of the control rods moves the valve plates transversely in their respective passageways; first fluid coupling means interconnecting the outlet section of the T-fitting and the inlet port of the outlet valve; second fluid coupling means isolated from and independent of said first coupling means and interconnecting the by-pass section of the T-fitting and the inlet port of the by-pass valve, the outlet port of the by-pass valve being adapted to be connected to such a reservoir and the outlet port of the outlet valve being adapted to be connected to such a utilization outlet; and meshing gears of uniform size individually rigidly connected to the control rods whereby the cross-sectional area of each passageway can be varied in incremental amounts between maximum and zero, the plates being initially adjusted in their respective passageways in 180° phase displacement with respect to each other whereby rotation of the gears causes alternate and opposite movement of the plates, and whereby the sum of said effective cross-sectional areas of the passageways being always the same so that the difference is quantity of asphalt between the total quantity delivered from such a pump and that delivered from the outlet port of the outlet valve is returned to such a reservoir thereby enabling incremental variation in the quantity of asphalt flowing from the outlet of the outlet valve from zero amount to a maximum without changing the quantity flowing from the pump.

2. An apparatus for metering the flow of liquid asphalt between a utilization outlet and a reservoir from a pump delivering a substantially constant quantity of liquid asphalt comprising a fitting including a pump section adapted to be connected to such a pump, an outlet section, and a by-pass section; individual outlet and by-pass valves of uniform construction, each valve including a valve body having inlet and outlet ports, a fluid passageway of uniform maximum cross-sectional area interconnecting its respective ports, said passageways having substantially the same maximum cross-sectional areas, each valve body having a U-shaped groove partially circumscribing and opening into the passageway therein, a flat valve plate slidably fitted in the groove of each body and being movable therein transversely in its respective passageway between positions fully opening and fully closing such passageway and intermediate positions partially opening the passageway, each groove and its associated plate having a substantially uniform dimension measured longitudinally of their passageway but with said dimension of the groove being slightly greater than that of the plate to permit said slidable movement, each of the valve plates having an end edge disposed toward its associated passageway and, together with the groove, defining the effective asphalt admitting cross-sectional area of such passageway in the partially and fully open positions of the valve plate, and a control rod rotatably mounted in each body exteriorly of its passageway and connected to its associated valve plate whereby rotation of the control rods moves the valve plates transversely in their respective passageways; first fluid coupling means interconnecting the outlet section of the fitting and the inlet port of the outlet valve; second fluid coupling means isolated from and independent of said first coupling means and interconnecting the by-pass section of the fitting and the inlet port of the by-pass valve, the outlet port of the by-pass valve being adapted to be connected to such a reservoir and to such a utilization outlet; and meshing gears of uniform size individually rigidly connected to the control rods whereby the cross-sectional area of each passageway can be varied in incremental amounts between maximum and zero, the plates being initially adjusted in their respective passageways in 180° phase displacement with respect to each other whereby rotation of the gears causes alternate and opposite movement of the plates, and whereby the sum of said effective cross-sectional areas of the passageways is always the same so that the difference in quantity of asphalt between the total quantity delivered from such a pump and that delivered from the outlet port of the outlet valve is returned to such a reservoir thereby enabling incremental variation in the quantity of asphalt flowing from the outlet of the outlet valve from zero amount to a maximum without changing the quantity flowing from the pump.

3. An apparatus for metering the flow of liquid between a utilization outlet and a reservoir from a pump delivering a substantially constant quantity of liquid comprising a fitting including a pump section adapted to be connected to such a pump, an outlet section, and a by-pass section; individual outlet and by-pass valves of uniform construction, each valve including a valve body having inlet and outlet ports, a fluid passageway of uniform maximum cross-sectional area interconnecting its respective ports, said passageways having substantially the same maximum cross-sectional areas, each valve body having a channel-shaped groove partially circumscribing and opening into the passageway therein, a valve plate slidably fitted in the groove of each body and being movable therein transversely in its respective passageway between positions fully opening and fully closing such passageway and intermediate positions partially opening the passageway, each of the valve plates having an end edge disposed toward its associated passageway and, together with the groove, defining the effective liquid admitting cross-sectional area of such passageway in the partially and fully open positions of the valve plate, and a control rod movably mounted in each body and being connected to its associated valve plate whereby predetermined movement of the control rods moves the valve plates transversely in their respective passageways; first fluid coupling means interconnecting the outlet section of the fitting and the inlet port of the outlet valve; second fluid coupling means isolated from and independent of said first coupling means and interconnecting the by-pass section of the fitting and the inlet port of the by-pass valve, the outlet port of the by-pass valve being adapted to be connected to such a reservoir and the outlet port of the outlet valve being adapted to be connected to such a utilization outlet; and means interconnecting the control rods for opposite and alternate movement thereof in incremental amounts whereby the cross-sectional area of each passageway can be varied in incremental amounts between maximum and zero, the plates being initially adjusted in their respective passageways in 180° phase displacement with respect to each other whereby alternate and opposite movement of the rods causes alternate and opposite movement of the plates, and whereby the sum of said effective cross-sectional areas of the passageways is always the same so that the difference in quantity of liquid between the total quantity delivered from such a pump and that delivered from the outlet port of the outlet valve is returned to such a reservoir thereby enabling incremental variation in the quantity of liquid flowing from the outlet of the outlet valve from zero amount to a maximum without changing the quantity flowing from the pump.

(References on following page)

References Cited in the file of this patent

UNITED STATES PATENTS

| | | |
|---|---|---|
| 737,273 | Reynolds | Aug. 25, 1903 |
| 906,783 | Du Brie | Dec. 15, 1908 |
| 979,532 | Merrill | Dec. 27, 1910 |
| 1,172,833 | Ricker | Feb. 22, 1916 |
| 1,888,542 | Rosberg | Nov. 22, 1932 |
| 2,056,902 | Longnecker | Oct. 6, 1936 |
| 2,438,389 | Edge | Mar. 23, 1948 |
| 2,582,802 | Terrell | Jan. 15, 1952 |
| 2,790,461 | Lightfoot | Apr. 30, 1957 |

FOREIGN PATENTS

| | | |
|---|---|---|
| 5,852 | Switzerland | Sept. 14, 1892 |